No. 614,256. Patented Nov. 15, 1898.
H. C. SWAN.
KING BOLT SOCKET.
(Application filed Oct. 29, 1897.)

(No Model.)

WITNESSES
C. E. Mackoun
Warren W. Swartz

INVENTOR
Henry C. Swan
by Bakewell & Bakewell
his attys.

THE NORRIS PETERS CO., PHOTO-LITHO., WASHINGTON, D. C.

UNITED STATES PATENT OFFICE.

HENRY C. SWAN, OF OSHKOSH, WISCONSIN.

KING-BOLT SOCKET.

SPECIFICATION forming part of Letters Patent No. 614,256, dated November 15, 1898.

Application filed October 29, 1897. Serial No. 656,785. (No model.)

*To all whom it may concern:*

Be it known that I, HENRY C. SWAN, of Oshkosh, in the county of Winnebago and State of Wisconsin, have invented a new and useful Improvement in King-Bolt Sockets, of which the following is a full, clear, and exact description, reference being had to the accompanying drawings, forming a part of this specification, in which—

Figure 1:
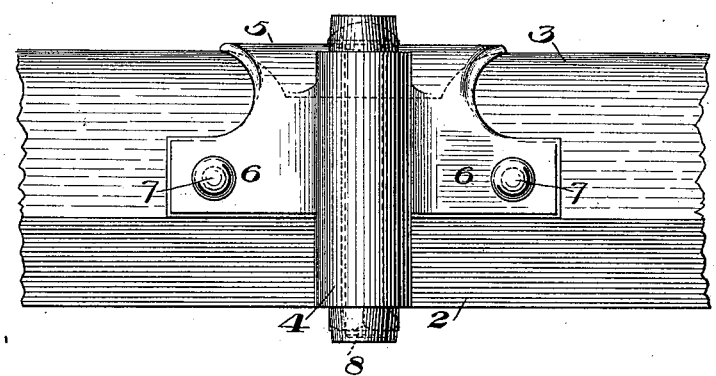
Figure 2:
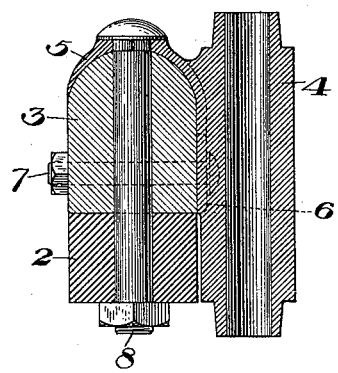

Figure 1 is a rear elevation of my improved socket secured in place, and Fig. 2 is a sectional side elevation of the same.

My invention relates to that class of king-bolt sockets which are secured to the axle and axle-bed by a vertical bolt extending centrally through the axle and axle bed or stock; and its object is to provide a socket of this character which may be attached to the axle by bolts instead of the clips ordinarily used therefor, as well as to bring the socket into contact with the axle and give the same a neat and desirable appearance.

In the drawings, 2 represents the axle, 3 the axle-bed, and 4 the king-bolt socket.

5 is an axle-plate which is cast or otherwise formed integral with the socket and which is curved, as shown, so as to partially encircle the upper part of the axle-stock and preferably provided with side ears or wings 6 6, extending laterally and arranged to be secured by two bolts 7 7, extending through the axle.

8 is the vertical bolt which passes through the axle-plate, the axle, and the axle-stock and secures these three parts rigidly together.

A bottom axle-plate having at its rear end a boss to receive the lower end of the king-bolt socket may be used as desired, and many other parts common to these devices may be employed in addition to those shown.

The advantages of my invention result from the fact that the socket may be secured without the use of clips, and it may be brought into full contact with the axle. By using the short clip-plate integral with the socket, as shown, the top of the axle-stock may be rounded, giving it a neat appearance.

I claim—

1. The combination of a king-bolt socket, having a laterally-projecting axle-plate, said plate being arranged to partially encircle the top of the axle, and a vertical bolt arranged to extend through the axle-plate and axle and secure the king-bolt socket thereto, substantially as described.

2. The combination with a king-bolt socket having at one side and integral therewith an axle-plate arranged to partially surround the top of the axle, of a vertical bolt arranged to extend through the plate and axle and secure the king-bolt socket thereto, substantially as described.

3. The combination with a king-bolt socket, of an axle-plate formed integral therewith and extending laterally from its side, and a bolt arranged to extend vertically through the plate and axle, substantially as described.

4. The combination with a king-bolt socket having at one side an integral curved axle-plate partially surrounding the upper part of the axle-stock, said plate having lateral ears provided with transverse bolts, of a vertical bolt extending through the plate, the axle-stock and the axle, substantially as described.

In testimony whereof I have hereunto set my hand.

HENRY C. SWAN.

Witnesses:
JOHN H. BAEHR,
S. T. BERRY.